United States Patent [19]
Bowater et al.

[11] Patent Number: 5,970,126
[45] Date of Patent: Oct. 19, 1999

[54] COMMUNICATION METHOD AND SYSTEM

[75] Inventors: Ronald John Bowater; Nicholas David Butler, both of Romsey; David Andrew Clarke, Chandler's Ford; Stephen Graham Copinger Lawrence, Southampton, all of United Kingdom

[73] Assignee: International Business Machines Corporation, Armonk, N.Y.

[21] Appl. No.: 08/868,085

[22] Filed: Jun. 3, 1997

[30] Foreign Application Priority Data

Aug. 9, 1996 [GB] United Kingdom .................. 9616817
Nov. 19, 1996 [GB] United Kingdom .................. 9623998

[51] Int. Cl.$^6$ .................................................. H04M 15/00
[52] U.S. Cl. .................. 379/114; 379/112; 379/133; 379/134; 379/201; 379/221
[58] Field of Search ........................ 370/351–356, 370/401–402; 340/827; 379/112–115, 133–134, 219–221, 202, 204–207, 279, 198, 231, 234, 225, 201, 229, 243, 232, 233

[56] References Cited

U.S. PATENT DOCUMENTS

| | | |
|---|---|---|
| 4,594,477 | 6/1986 | Noirot . |
| 5,027,387 | 6/1991 | Moll ........................................ 379/112 |
| 5,065,393 | 11/1991 | Sibbitt et al. ........................... 379/112 |
| 5,420,914 | 5/1995 | Blumhardt ............................. 379/114 |
| 5,602,846 | 2/1997 | Holmquist et al. . |
| 5,608,786 | 3/1997 | Gordon . |
| 5,712,907 | 1/1998 | Wegner et al. ........................ 379/112 |
| 5,799,072 | 8/1998 | Vulcan et al. ......................... 379/114 |
| 5,825,858 | 10/1998 | Shaffer et al. . |

FOREIGN PATENT DOCUMENTS

| | | |
|---|---|---|
| 34289/95 | 5/1996 | Australia . |
| 0658061 | 6/1995 | European Pat. Off. . |
| 2300089 | 10/1996 | United Kingdom . |
| WO92/05650 | 4/1992 | WIPO . |
| WO93/16544 | 8/1993 | WIPO . |
| WO94/28683 | 12/1994 | WIPO . |

*Primary Examiner*—Paul Loomis
*Assistant Examiner*—Duc Nguyen
*Attorney, Agent, or Firm*—Jeanine S. Ray-Yarletts

[57] ABSTRACT

The present invention relates to establishing a communication channel between two communication systems having computer telephony integration (CTI). Many CTI systems are configured into incoming and outgoing lines according to the anticipated demands. Consequently, if sufficient outgoing or incoming capacity is unavailable at a given time to support a communication channel of required characteristics, the users of such a system must conventionally wait until sufficient capacity becomes available. However, the present invention determines who the intended addressee is and can instruct the CTI system associated with that addressee to instigate the establishment of a communication channel to the user who originally desired the connection. The instructions can be sent to the intended addressee using for example, another communication network, such as the Internet or other data communications network. This arrangement also allows the call to be placed in the reverse direction, where this is favourable for tariff reasons. The invention also includes the automatic selection of a telephone network carrier based on tariff data requested over a data network such as the Internet.

17 Claims, 11 Drawing Sheets

COMMUNICATION METHOD AND SYSTEM

FIELD OF THE INVENTION

The present invention relates to a method and system for establishing a communication channel between first and second communication systems.

Telephony or communication systems used by large organizations, such as banks, insurance companies and the like, have, as part of their daily operation, the need to be able to support a significant number of telephone enquiries. The communication systems of such large organizations are configured according to the specific needs of that organisation. For example, a large car insurance organisation may require a significant number or high availability of incoming lines in anticipation of a large number of incoming calls from parties soliciting car insurance quotes. However, the number of outgoing lines may be appreciably less than the number of incoming lines in such a scenario due to the relatively low anticipated outgoing traffic. In contrast, a telesales organisation would require a significant number or high availability of outgoing lines by which potential customers of the organisation can be contacted and the anticipated incoming traffic may be relatively less.

BACKGROUND OF THE INVENTION

With prior art telephony systems, if a user of a telephone in an organisation having a switch configured above wishes to establish, say, an outgoing call, and all outgoing lines are currently fully utilised, that user will have to wait until an outgoing line or sufficient outgoing capacity is available. Similarly, if a third party wishes to call that user and all of the incoming lines to that organisation are busy, that third party would have to wait until an incoming line is available.

The same situation may arise with any communication system which has a limited bandwidth over which information or data can be transmitted. For example, with a multimedia computer capable of generating a plurality of information media types, such as video, data or sound, if there is insufficient outgoing capacity to support a communication link between, say, two such computers used for collaborative or group working, then users of those computers will have to wait until sufficient outgoing capacity to support communication therebetween is available.

Another concern that has arisen is the asymmetric nature of telephone costs. In other words, the price of a call of a given length between A and B may depend on whether A initially dialled B, or vice versa. These differences tend to be particularly significant for international calls, but may also exist for example where the parties are very disparate in size, and one has negotiated a discounted rate in view of its high volume of calls. However, it has been very difficult in the past to be able to exploit such charging differences in order to minimise call costs.

A further concern is that tariff charges vary depending on the telephone provider as well as on the country from which the call is initiated and when the call is made. Previously, in the majority of countries where there is limited or no competition, enterprises have been forced to buy international telephone calls at fixed tariffs offered by local suppliers and as a result providers have been making excess profits from international calls. However there now exist alternative network providers or agencies which buy international telephone capacity in bulk and sell it at a discount. Users can call the local offices of the agency who then set up the call over the agency's network and call the user back when the connection is made. Unfortunately this manual process is tedious and discourages users. Other agencies re-sell their bulk purchased capacity by updating the call routing tables in the user's telephone switch. This can be very time consuming as the agency has to manually reprogram the call routing tables and has a further disadvantage that the user is still closely tied to a single agency or network provider.

SUMMARY OF THE INVENTION

According to a first aspect, the invention provides a method of establishing a communication channel between first and second communication systems connected by a computer network and at least one telephony network, the method comprising the steps of; requesting over the computer network the establishment of a communication channel between the first and second systems; determining the nature of the communication channel according to one or both of the following variables: (i) which one of the at least one telephony network is to route the communication channel; and/or (ii) which one of said first or second communication systems is to establish the communication channel; and establishing the communication channel according to the determination.

According to a second aspect, the invention provides a method for establishing a communication channel between first and second communication systems connected by at least one communication network, the method comprising the steps of:

requesting the establishment of a communication channel between the first and second systems;

determining whether the first or second communication system should establish the communication channel; and establishing the communication channel according to the determination.

Thus the invention permits the establishment of the communication channel to be instigated either at the system which originally requests the call, or at the system which is the originally intended recipient of the call. Typically, the communication channel is established over the public telephone network. Since the instigator of a call generally receives the charge for the call, this method is most useful where both the first and second communication systems belong to the same corporate organisation (although of course the use of Freephone numbers would give added flexibility).

There are two main situations in which the above facility is of particular benefit. The first situation is where the tariffs for the same communications channel differ according to the network selected or whether it is set up by the first or second communication system. The second situation is where at least one of the communication systems has at least some dedicated incoming or outgoing communication lines. This is typically the case where for example the first communication system represents a telemarketing system, which will have a large number of lines assigned to outgoing calls, and relatively few to incoming calls (nb this is generally a logical assignment only, since essentially all physical connections are capable of bi-directional support).

In this latter situation, the step of determining preferably comprises the steps of:

establishing whether or not sufficient outgoing channel capacity is available from the first system to the second system to support the communication channel; and transmitting, in response to establishing that there is insufficient available outgoing channel capacity from the first system to support the communication channel, a message to the second system requesting the second system to instigate the establishment of the communication channel.

Thus if the first communication system does not have sufficient outgoing capacity for the communication channel (or does not want to use what is available), then it can send a message to the second communication system, asking for the channel to be established in reverse. An analogous situation can arise when a call comes through to the second communication system, which does not have sufficient incoming capacity to receive the call. Here the second communication system can respond by notifying the first communication system accordingly, and then set up the call itself. Note that the lack of channel capacity may represent a complete lack of outgoing/incoming lines as appropriate, or a restriction on bandwidth such that the requested communication channel can only be set up in one direction. For example, the system may desire to transmit video information to the second system, but there is insufficient outgoing capacity supported at that moment for such a connection.

In the situation where the calling cost arrangements may vary by network or may be asymmetric between the first and second communication systems, the step of determining preferably comprises ascertaining whether or not it is more cost effective to instigate the establishment of the communication channel at the first or second communication system.

Such an asymmetry in costs may arise where the tariff is dependent upon the amount of outgoing traffic from a location. Also the cost of a call may vary as a function of time with higher costs being incurred during peak traffic hours. For example, it may be very expensive to establish a communication link between two communication systems, one of which is located in the US and the other of which is located in the UK, if the UK communication system outgoing link is established during peak UK hours. The UK off-peak hours may be such that both parties would not be simultaneously available. However, it may be possible to initiate the call from the US under US off-peak rates, even though these may partly overlap in time with UK peak hours. Another possibility is that different locations may be served by different telephone companies which have different call rates.

In one preferred embodiment, this step of determining at which end to initiate the connection is performed at a third communication system connected to said first and second communication systems by said at least one computer network. Typically this third system maintains data relating to the first and second communication systems for use in the step of determining, said data including data representative of the prevailing call tariffs at said first and second communication systems. The data is generally updated by said first and second communication systems, for example whenever their respective call tariffs change. The third system can belong to the same organisation as the first and second communication systems, or might be available as a service offering from a third party supplier. Typically the third system is attached to the Internet, and can perform this function for many other communication systems which are also attached the Internet. Note that this third system may in fact be coincident with either the first or second communication systems, or may be distributed or replicated across the network.

The operation with the third system if the first communication system desires to initiate a communication channel with the second communication system may be approximately as follows. The first communication system transmits an indication of its desire to the third system, which determines the direction and carrier network which will minimise the cost of the call. This can be based on tariff information stored in or accessible to the third system, or as a result of interrogating the second communication system (assuming that the first communication system could provide its own tariff information with the set-up request). The third system then notifies whichever communication system is appropriate to instigate the call in the preferred direction. Alternatively, the response may always go to the first communication system, which then instructs the second communication system to instigate the call where appropriate.

If no third system is used, then the first and second communication systems can negotiate to determine which of them should instigate the call. For example, the first system could pass a request for a call to the second system, along with tariff information prevailing at the first system. The second system would compare this tariff information with its own tariff information, and depending on the resultant cost situation, either instigate the call itself, or send a response to the first system indicating that it should instigate the call there. A slightly different approach would be for the first system to initially request tariff information from the second system. The determination as to the preferred direction would then be performed at the first system, with the second system being requested to instigate the call where appropriate.

Assuming that it is the first communication system that initially desires to set up the communication channel, then typically it waits a predetermined period of time for a response to its transmission to the second or third system as appropriate. In the absence of any reply within said predetermined time period, the first communication system tries to establish the communication channel itself in conventional fashion.

The invention exploits the increasing use of CTI (Computer Telephony Integration) expand systems to provide sophisticated call handling facilities at call centres and other locations that process a relatively large number of incoming and/or outgoing telephony calls. Such CTI systems effectively allow centralised monitoring and control of each extension. Traditionally these CTI systems have operated independently from one another.

The invention however recognises that the very wide acceptance of the Internet to link computers together offers the possibility of integrating CTI systems together to provide new functionality, including the ability to instigate a call in the least cost direction and using the lowest cost network. In particular, it is recognised that CTI systems connected by the Internet (in addition to the conventional telephone network) have a means of low cost signalling with one another that can be exploited to provide this new functionality. Of course, the end to end delay over the Internet tends to be somewhat greater than over the conventional telephone network, but for call set-up a delay of a couple of seconds is not normally significant. Moreover, a time-out provision is preferably used, so that if the Internet delays become too severe, then prior art call placement techniques are used by default.

It will be appreciated that the Internet provides all the networking required to support communications between different CTI systems, effectively transparently to the user. Thus one CTI system can communicate with another CTI system over the Internet quickly and easily, without requiring any knowledge of the underlying network structure supporting the communication (e.g. which gateways to use, and so on). It will further be recognised that exploiting the Internet infrastructure is a very cost-effective way of communicating between sites as compared to the use of, for example, leased lines or the telephony network.

The invention further provides apparatus for establishing a communication channel between first and second communication systems connected by at least one communication network, comprising:

means for receiving a request for the establishment of a communication channel between the first and second systems;

means for determining whether the first or second communication system should establish the communication channel; and means for initiating the establishment of the communication channel according to the determination.

According to a third aspect of the invention a method of establishing a communication channel between first and second communication systems and at least two telephony networks, the method comprising the steps of; requesting the establishment of a communication channel between the first and second systems; determining which one of the at least two telephony networks is to route the communication channel; and establishing the communication channel according to the determination.

The invention therefore permits the establishment of a communication channel from a choice of telephone network providers without the need for manual effort in setting up. A user having the choice of two or more telephone network providers can select the one which is most appropriate for the call. Advantageously the step of determining which one of the plurality of telephone networks to use comprises the step of exchanging messages between one of said communication systems and each of the telephone networks over the communication network. Such a quick and simple method increases the choice in the market and encourages competitiveness.

Preferably the step of determining which one of the plurality of telephone networks to use comprises ascertaining which one is more cost effective. Choosing between telephone providers can be of great economical benefit when making international calls especially when the number of telephone network providers is increasing creating a competitive market and driving down prices.

The step of determining which one of the plurality of telephone networks to use is advantageously performed at a fourth communication system connected to said first and second communication systems by at least one computer network. This minimizes the overall resources needed for such a determination by allowing them to be centralised in one location. Preferably data relating to each of the plurality of telephone networks for use in the step of determining is stored at said fourth communication system, said data including data representative of the call tariffs at each of the plurality of telephone networks. Such data allows for a faster determination without the need to contact each of the telephone network providers whenever determination is required. The data maybe be updated by contacting the network providers as frequently as required.

BRIEF DESCRIPTION OF THE DRAWINGS

Embodiments of the invention will now be described, by way of example only, with reference to the following drawings in which.

DETAILED DESCRIPTION OF THE PREFERRED EMBODIMENTS

Figure 1:
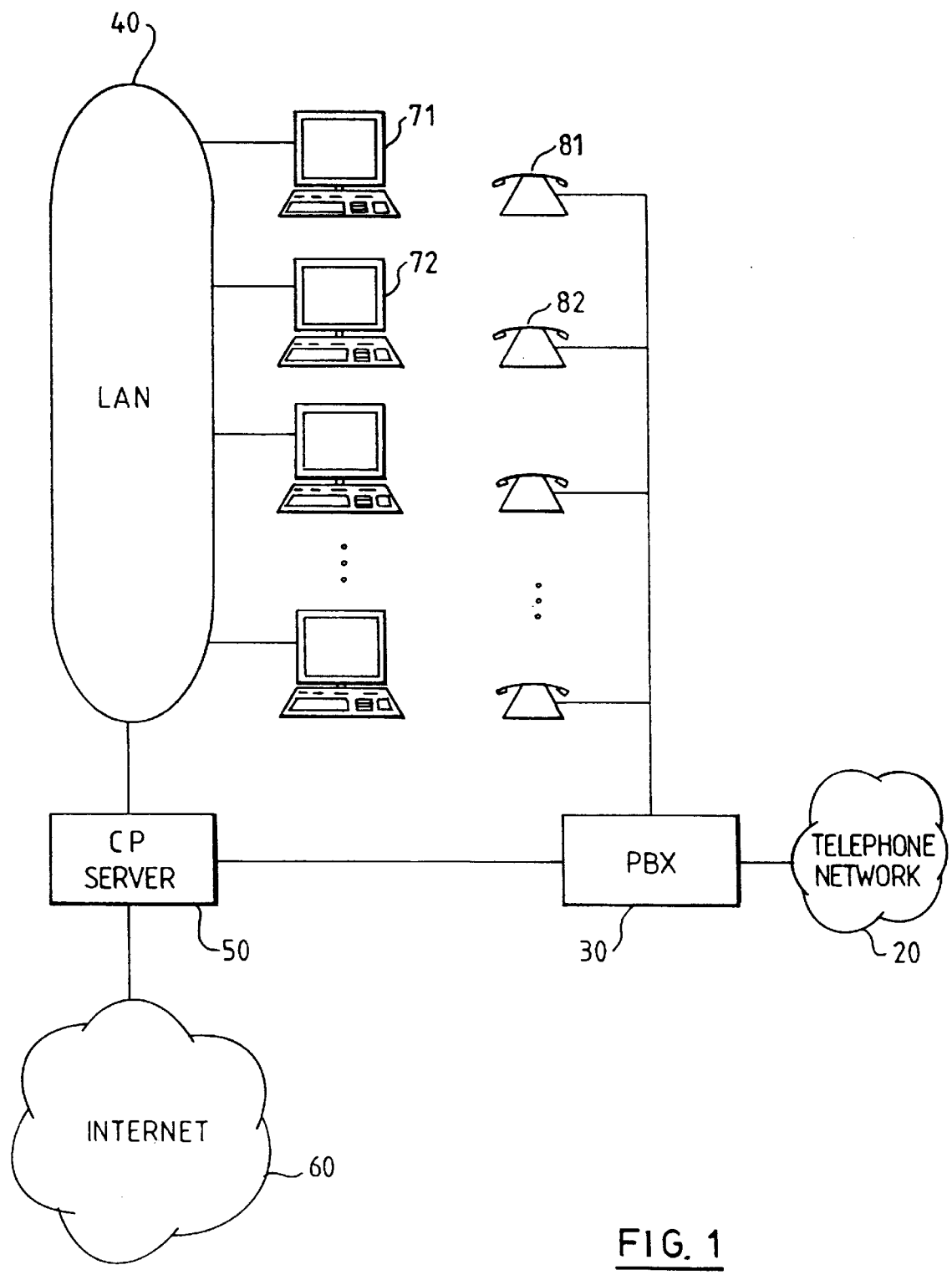
FIG. 1 illustrates a typical installation having computer telephony integration (CTI)

FIG. 1 illustrates a typical system with computer-telephony integration (CTI). The telephony side of the system comprises a switch or PBX 30, which is attached to the public telephone network 20, to allow access to and from external parties. Attached to the PBX in known fashion are a plurality of telephone extensions 81, 82, which are assigned to respective agents. Each agent also has a client personal computer or workstation 71, 72, which is attached via a local area network 40 to a server machine 50. Typically the server and client use the well-known TCP/IP protocol for their communications. The server also has a computer link to the PBX 30, possibly via an intermediate protocol conversion system (not shown).

An example of the use of the CTI system of FIG. 1 is to provide information about a caller on the terminal of the agent who is about to receive that call. Thus when an incoming call is received, it may be possible to identify the caller based on the calling or called number (ANI/DNIS CLI information). The PBX therefore passes ANI/DNIS information received from the network to the server, which uses this information to access relevant details about the caller. The server can then instruct the PBX to route the call to a particular extension (for example to an agent who has dealt with this caller previously), and at the same time cause the retrieved information about the caller to be displayed on the client screen. Another example of the use of the CTI system is intelligent dialling, whereby a caller selects a number from his or her screen. This then passes a message to the server, which in turn instructs the PBX to dial out to that number, and connect the call when answered to the extension of the relevant agent.

It will be appreciated that the CTI system illustrated in FIG. 1 is very well-known in the art. One example is based on the Callpath system available from IBM, where for example the server may comprise the Callpath Server/2 program running on an IBM PS/2 workstation or equivalent under the OS/2 operating system, or the AIX Callpath Server/6000 program running on a RISC System/6000 workstation. Each client may comprise (for example) an IBM PS/2 workstation or equivalent running the OS/2 operating system or the Microsoft Windows operating system, and a RISC System/6000 workstation running the AIX operating system. The clients and server may communicate using the TCP/IP protocol over a Token Ring or Ethernet local area network. Further information about the Callpath products can be found in the Callpath manuals available from IBM Corporation, such as IBM Callpath Coordinator for OS/2 and Windows General Information (order number GC22-0074) and the manuals referenced therein.

As shown in FIG. 1, the server 50 is also connected to the Internet 60. Such a connection is not required for operation as a conventional CTI system, but is very straightforward for the skilled person to implement in view of the fact that the server already supports the TCP/IP protocol which is used for Internet communications. Such support is typically provided as part of the operating system running on the server, and is described for the AIX operating system (for example) in "AIX v4.1 System User's Guide: Communication and Network" (publication SC23-2545-01) and "AIX v4.1 Communications Programming Concepts" (publication SC23-2610-01) (both available from IBM Corporation).

Figure 2:
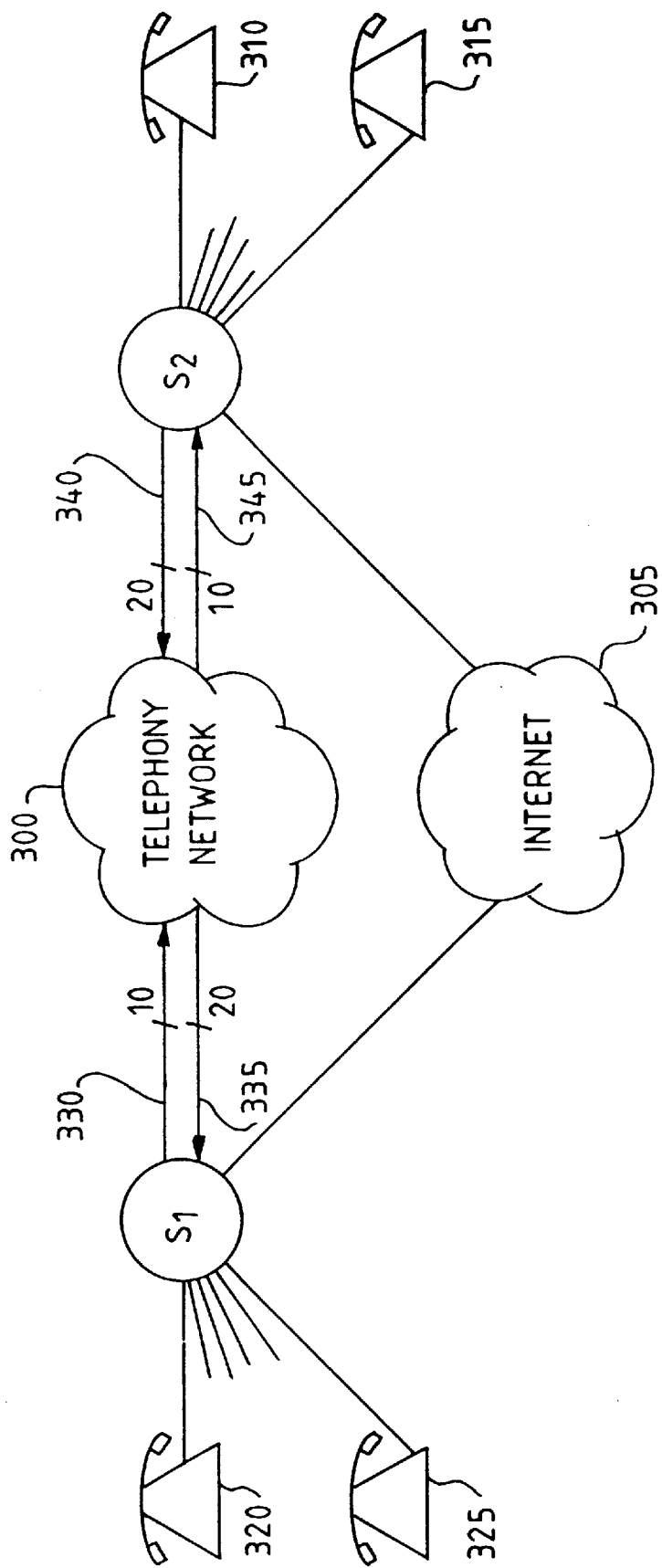
FIG. 2 illustrates schematically two CTI systems such as shown in FIG. 1, connected both by the telephone network and by the Internet.

FIG. 2 shows two CTI systems $S_1$ and $S_2$, substantially as described above with reference to FIG. 1, connected to each other firstly via the public telephone network 300 and secondly via the Internet 305. It will be appreciated that although the Internet is depicted as a separate network, in practice the Internet support structure may be provided by the same physical telephony network. Nevertheless, from the perspective of the users of $S_1$ and $S_2$, the two networks are logically distinct. Each CTI system is capable of supporting a plurality of telephones 310 or other communication/data transmission devices such as facsimile machines, and so on. Typically the first and second CTI systems $S_1$ and $S_2$ both belong to the same organisation, such as a large corporation.

Assume that the first CTI system, $S_1$, has the following telephony traffic capacity: ten outgoing lines 330 and twenty incoming lines 335, and that the second CTI system, $S_2$, has twenty outgoing lines 340 and ten incoming lines 345. Furthermore, assume that all ten outgoing lines 330 of the first CTI system $S_1$ are busy and a user thereof wishes to establish a call with a user of the second CTI system $S_2$. The user of the first CTI system $S_1$ dials in the conventional manner the telephone number of the intended addressee who can be reached via second CTI system $S_2$. The first CTI system $S_1$ then makes a determination as to whether or not sufficient outgoing capacity is available to support a telephony connection. In the instant case the result of the determination will be that an outgoing call cannot be supported due to insufficient available outgoing capacity.

Figures 4, 5:
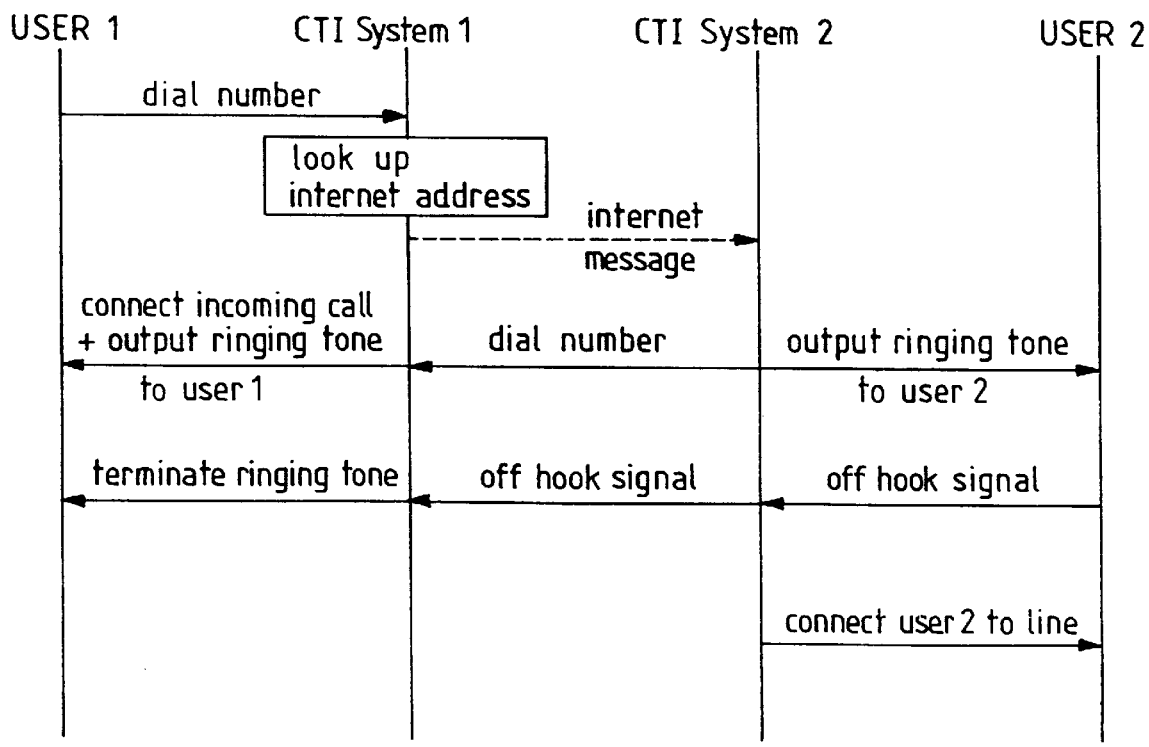
FIG. 4 shows schematically an address book for mapping a telephone number to a corresponding Internet address.
FIG. 5 shows the signal exchange of the arrangement of FIG. 2 in setting up a telephone connection.

The first CTI system $S_1$ contains an address book 500 or file, schematically represented in FIG. 4, which contains a list 505 of telephone numbers together with their corresponding Internet addresses 510. Upon making such a determination, the first CTI system, $S_1$, then matches the dialled number with a number stored in the address book 500 and retrieves the corresponding Internet address of the CTI system associated with that dialled number, that is, the second CTI system $S_2$. The first CTI system $S_1$ forwards an Internet message to the second CTI system $S_2$ using the corresponding Internet address. The message sent via the Internet contains sufficient information to allow the second CTI system $S_2$ to instigate a call to the first CTI system $S_1$. Upon receiving the Internet message, the second CTI system $S_2$ instigates a telephony call to the appropriate party who initially attempted to instigate the call and also causes the telephone of the intended addressee to ring. The intended addressee is a user of the second CTI system $S_1$. The first CTI system $S_1$ upon receiving the incoming call from the second CTI system outputs to the telephone of the first user a ringing tone. When the second CTI system $S_2$ detects an off-hook or equivalent signal, an indication that the second user $U_2$ has answered is transmitted to the first CTI system $S_1$. The second CTI system concurrently connects the second user's telephone to the telephony connection established between the CTI systems $S_1$ and $S_2$. The first CTI system $S_1$, responsive to the off hook signal, terminates the ringing tone and connects the first user $U_1$ to the telephony connection established between the CTI systems $S_1$ and $S_2$ thereby establishing the requisite telephony link between the two parties.

The signalling underlying the above implementation is shown schematically in FIG. 5. Initially User 1 specifies a telephone number of the intended addressee, either using telephone extension 81 or terminal 71, and this is passed to the server 50, via PBX 30 or LAN 40 as appropriate (in some situations, such as in telephone polling, the intended addressee may be automatically selected for the user). It is assumed that this results in the first user going off-hook. The first CTI system then uses a look-up table such as that shown in FIG. 4 to obtain the Internet address of the CTI system supporting the intended call recipient. Note that this look-up table need not necessarily reside on the server, but could for example be accessed remotely over the Internet 60 (provided of course that the server knows the location of the table).

The first CTI system then transmits an Internet message containing the telephone number of the original initiator of the call to the second CTI system, which responds by outputting a ringing tone to the intended addressee of the call, User 2, who is also identified in the received Internet message, and also dials out to the first CTI system. On receipt of this incoming call, the first CTI system connects the call to User 1, and outputs a ringing tone. When User 2 finally answers, this results in the establishment of the call between User 1 and User 2 in known fashion.

It will be appreciated that FIG. 5 does not depict the actual determination as to whether or not the call should be instigated in the reverse direction. This determination could be performed at either the first or second CTI system, or at a third system (see below). For example, if the determination was to be made at the first system, it might be performed directly after the number was originally dialled, in the situation where incoming lines but no outgoing lines were available.

Although the above embodiment has been described in terms of a communication between conventional telephony users of the CTI systems, the present invention is not limited thereto. For example, applications executing on the respective system which require a communication channel therebetween for data exchange may adopt this approach. In such case there may be outgoing lines available, but these may not have sufficient bandwidth for the desired form of data connection (perhaps a video link for example). Thus this approach can be adopted where there is more bandwidth available on the incoming lines than on outgoing lines.

It will also be appreciated that the above approach may be used to balance channel usage. For example, where a high fraction of outgoing lines are already in use, but only a small fraction of available incoming lines, then it may be desirable for new calls to use the incoming lines rather than risk saturating the outgoing lines. This is particularly important because there are likely to be some calls for which the direction of call is not flexible. For example, users of CTI system $S_1$ may also be contacting individual users at home, where no CTI control is available.

Referring again to FIG. 2, an alternative scenario can be envisaged in which the first CTI system $S_1$ has sufficient outgoing capacity but insufficient incoming capacity to support an incoming telephony call instigated by the second CTI system $S_2$. The second CTI system $S_2$, when attempting to establish a connection with the first CTI system $S_1$, would receive a signal from the telephone network 330 indicating that the first CTI system $S_1$ cannot accommodate the connection. The second CTI system $S_2$ therefore determines the Internet address of the first CTI system $S_1$ using an address book 500 as depicted in FIG. 4 and sends a message thereto indicating that the first CTI system $S_1$ should establish an outgoing call to the second CTI system $S_2$. Again, assuming the first CTI system $S_1$ has sufficient outgoing capacity, that system will instigate the establishment of a telephony connection to the second CTI system $S_2$. The signalling is then analogous to that described for the preceding example. An alternative approach would be for the first CTI system, $S_1$, to initiate the call directly, when it receives an incoming call from the second CTI system, $S_2$, which it is not able to accept, thereby reducing the amount of messaging required between the two CTI systems.

The messages exchanged between the CTI systems may contain various data describing, for example, the type of communication channel to be established or the characteristics of the required channel, such as bandwidth, quality of service, acceptable error rates etc, or the local cost of instigating a call together with the telephone number to be dialled and the calling number.

It will be appreciated that although the lines have been described as either incoming or outgoing, the physical lines themselves are conventionally duplex lines and have both incoming and outgoing traffic carrying capabilities, but are simply logically assigned as being either incoming or outgoing. The assignment of incoming or outgoing traffic carrying capacities of the lines can be varied, but often this is controlled by a subscription to the local telephone carrier, and so cannot be performed in real-time by the owner of the CTI system.

Figure 3:
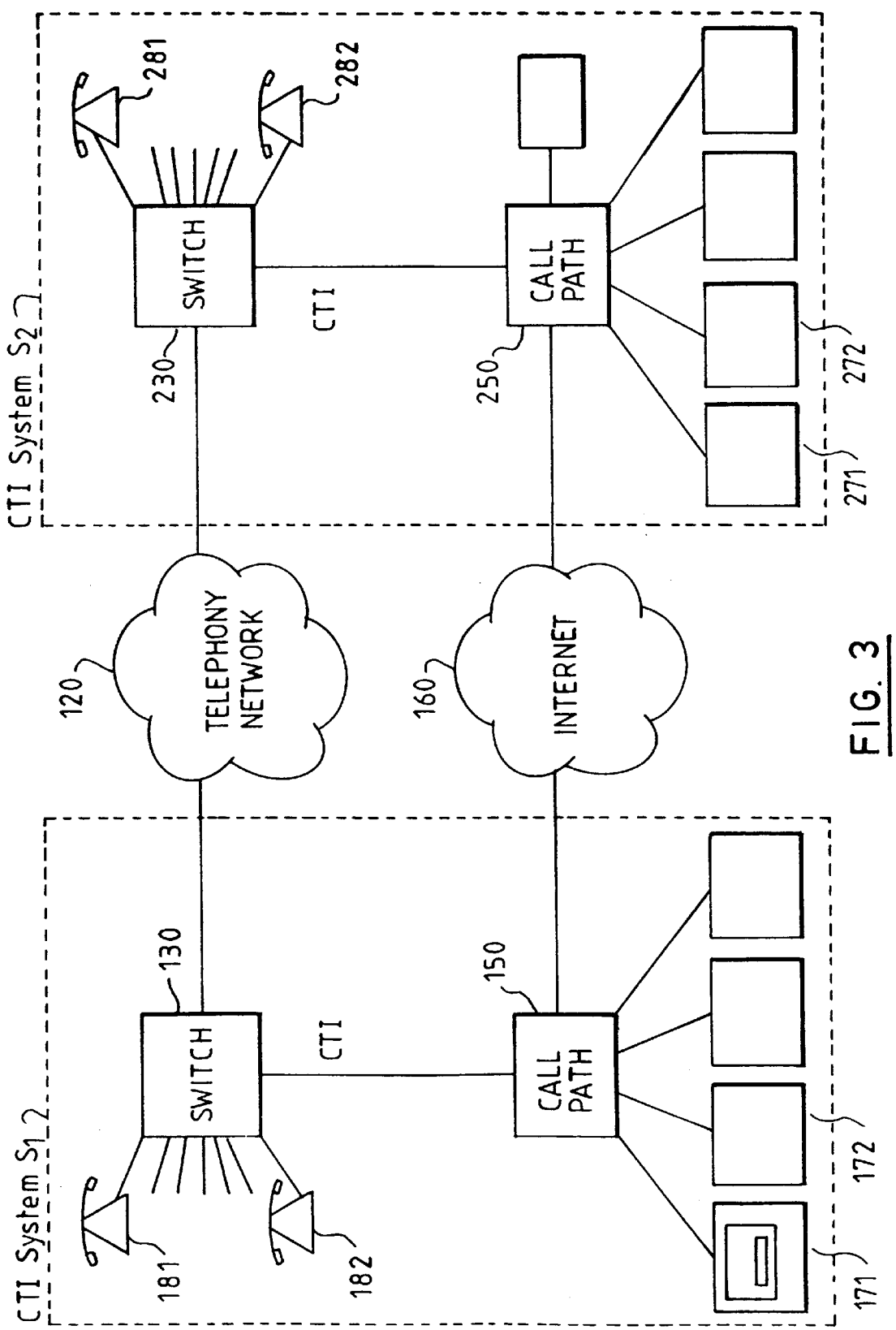
FIG. 3 illustrates in greater detail the arrangement depicted in FIG. 2.

Referring to FIG. 3, this shows two linked CTI systems, similar to those individually depicted in FIG. 1, which underlie the architecture of the communication arrangement depicted in FIG. 2.

A user of such a CTI system can instigate a call to another telephone using one of at least two methods. Firstly, in one embodiment, the user can dial the number of the intended addressee in the conventional manner using their telephone extension 181. The switch 130 forwards that number to the server 150 via the server-switch link. The server then determines whether the call connection should be instigated locally or whether the call connection should be instigated by the intended addressee at the remote system as previously described. If the determination is such that the call should be instigated locally, the CTI system instigates the establishment of the call by controlling the switch in the conventional manner. However, if the determination is such that the call should be instigated by the intended addressee, the processing continues as described above in relation to FIG. 2. Typically, the server 150 determines the Internet address of the server 250 associated with the intended addressee and forwards an Internet message to that server containing an indication that the telephony connection should be instigated between the users and the appropriate telephone numbers of the parties between whom the connection is to be established.

In an alternative embodiment, the telephone number of the intended addressee can be entered using a Web browser running on a client terminal 171 which has accessed an appropriate page on the server 150. This page may represent a directory of all the users in the corporation. The user of the client terminal enters the telephone number of the intended addressee using an input field with a Web Browser in known fashion, which the Web Browser then submits to the server 150, or the user may perhaps simply select the name of the intended addressee, with the server converting this into a telephone number. In response to receiving the telephone number from the user, the server launches an instance of an application which determines, in a manner substantially described above, whether the telephony call should be established locally or remotely based upon predeterminable criteria such as channel availability. Generally the application will be run on the server, although conceivably it could be downloaded onto the client itself.

In the preceding embodiments the direction of call placement has been based on the availability of incoming and outgoing lines. However, in another preferred embodiment, the direction of call placement is determined by whether it is more cost effective to instigate the call from, for example, the second CTI system $S_2$, due to different prevailing call tariffs, rather than from the first CTI system $S_1$. For example, assume that the cost of a telephone call instigated from the first CTI system $S_1$ is X whereas that of the second CTI system $S_2$ is Y, where X>Y. It would be more cost effective to instigate the telephone call from the second CTI system $S_2$ rather than from the first CTI system $S_1$. Therefore before establishing a communication channel between the first $S_1$ and second $S_2$ CTI systems a determination is made as to which CTI system should instigate the call. Thus if CTI system $S_1$ receives a telephone number dialled by a user $U_1$ thereof, a determination as to the cost situation is made using an extended form of the address book 500. Such an extended address book also contains an indication of the call tariff prevailing at the remote location corresponding to the dialled number. The first CTI system $S_1$ identifies the dialled number in the address book 500 and determines this remote call tariff. If the determined call tariff is greater than the local call tariff at $S_1$, the first CTI system $S_1$ instigates the call. However, if the determined remote call tariff of the second CTI system $S_1$ is less than the local call tariff of the first CTI system $S_1$, the first CTI system $S_1$ sends a message to the second CTI system $S_2$ via the Internet indicating that a telephony channel should be established between the CTI systems and ultimately the users of the systems. The signalling involved in realising the telephony connection and content of the Internet message are substantially as described above.

The differing call tariffs may arise as a consequence of, for example, the CTI systems being located in different countries or one CTI system having a significantly larger number of leased telephony lines and thereby being able to benefit from economies of scale when negotiating the cost of the leased lines, or as a consequence of being located in different geographic areas serviced by different telephony companies.

An alternative approach is for the first CTI system $S_1$ to send a message to the second CTI system $S_2$ via the Internet containing an indication of the number to be dialled, the calling number, and the prevailing call tariff at the first CTI system $S_1$. The second CTI system $S_2$ receives the Internet message and determines whether it is more cost effective for it to instigate the establishment of a telephony call or vice versa. If the determination is such that the overall cost of establishing a telephony connection between the first $S_1$ and second $S_1$ CTI systems is less if second CTI system $S_2$ instigates the call, then that second CTI system $S_2$ instigates the call to the first CTI system $S_1$ using the number or other identifier provided by the Internet message. However, if the determination is such that it is more cost effective that first CTI system $S_1$ establishes the call the second CTI system $S_2$ sends, via the Internet, a message to the first CTI system $S_1$ indicating that the telephony call should be established by the first CTI system $S_1$.

A variation on the above is for the second CTI system $S_2$ not to send a return message, with the first CTI system $S_1$ merely waiting a predetermined period of time for such a return message. If no such return message is forthcoming within the predetermined period of time, then the first CTI system $S_1$ assumes that the determination made by the second CTI system $S_2$ is such that the telephony call should be established by the first CTI system $S_1$. The advantage of this approach is that it reduces the amount of Internet traffic and the amount of processing performed by each CTI system.

Figure 6:
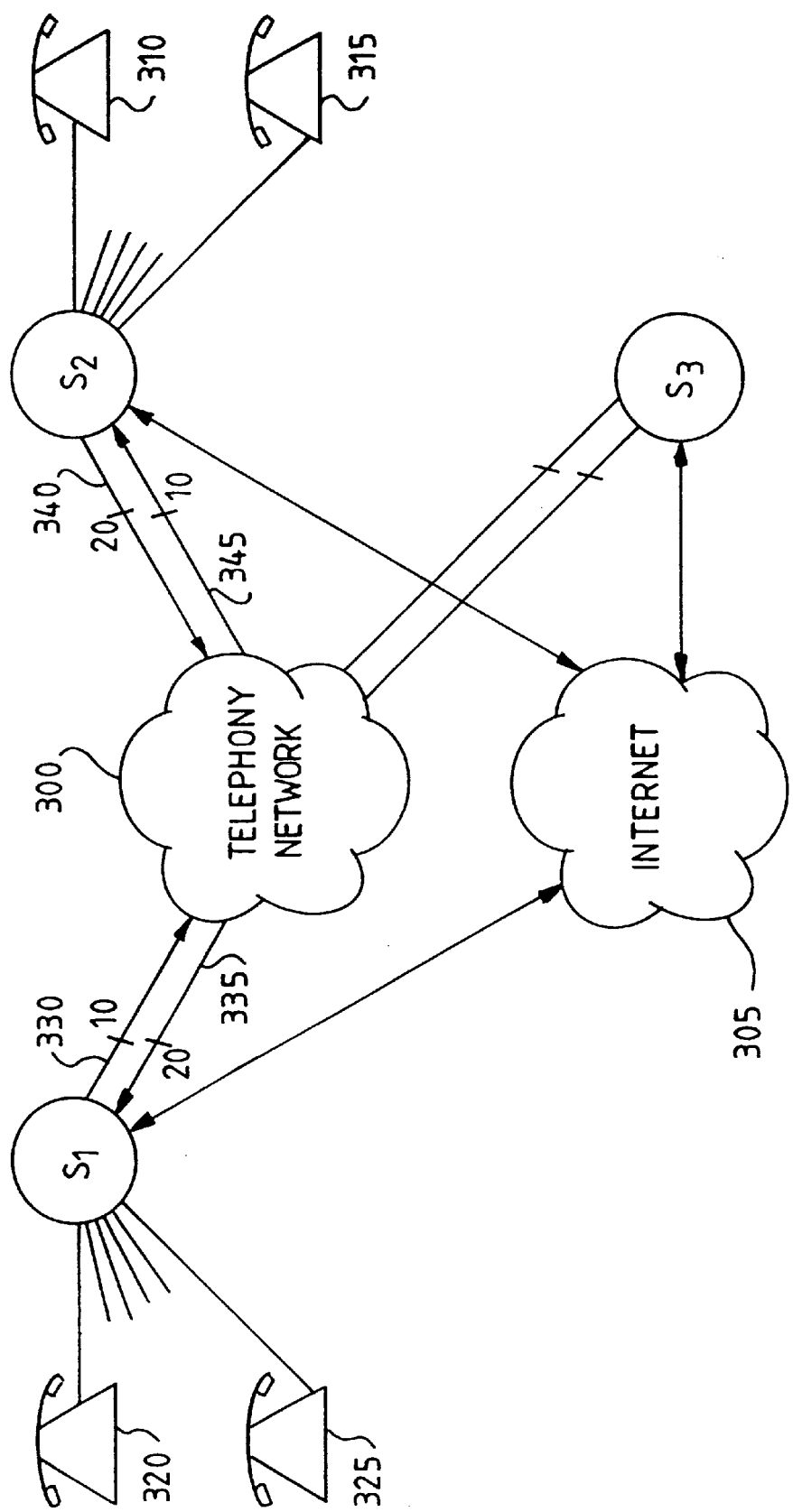
FIG. 6 shows schematically a variation on the embodiment of FIG. 3, where a third system is involved in the call set-up decision.

In another embodiment, the step of determining is undertaken by a third system $S_3$. Referring to FIG. 6 there is shown a communication system in which first $S_1$ and second $S_2$ CTI systems are connected to the telephony network and Internet as per FIG. 2, and a third communication system $S_3$ is also connected thereto. The third communication system $S_3$ may be a CTI system or, for example, a telephony switch. Alternatively, the third system may simply be a computer, in which case it may not have any link into the telephone network 300. In any case, the third system $S_3$ is adapted so as to be able to exchange data with said first $S_1$ and second $S_2$ CTI systems over the Internet 305. When a user of the first CTI system $S_1$ dials a number using one of the telephones 320, 325 connected thereto or requests the establishment of a communication channel to the second CTI system $S_2$ and there is insufficient outgoing channel capacity from the first CTI system $S_1$ to support said communication channel, the first CTI system $S_1$ transmits a message to the third system $S_3$ via the Internet 305 indicating that a communication channel to the second CTI system has been requested. The third communication system $S_3$ maintains a table of data relating to both the first $S_1$ and second $S_2$ CTI systems. In this embodiment, the table contains an indication of the currently available incoming and outgoing channel capacities of the first and second CTI systems. The third system $S_3$ determines whether or not the second CTI system $S_2$ has sufficient outgoing channel capacity to accommodate the request of the user of the first CTI system $S_1$. If the second CTI system $S_2$ does have sufficient capacity to support such an outgoing call, the third system $S_3$ sends a message, via the Internet 305 or another available means, to the second CTI system $S_2$ indicating that a communication channel should be established with the first CTI system $S_1$. The second CTI system $S_2$, in response to receiving the message from the third system $S_3$, then instigates the establishment of a communication channel to the first CTI system $S_1$ in the same manner as described with reference to FIG. 2. Hence, a communication channel is established between the first $S_1$ and second $S_2$ CTI systems notwithstanding the lack of availability of outgoing channel capacity at the first CTI system $S_1$. Generally, when the channel is established either the first or second CTI system sends an indication to that effect to the third system $S_3$ which modifies the table of data accordingly. If the second CTI system $S_2$ does not have sufficient channel capacity to accommodate a channel to the first CTI system $S_1$, the third system $S_3$ sends a message to the first CTI system containing an indication to that effect whereupon the first CTI system outputs a "line unavailable" signal to the user thereof.

The third system $S_3$ may maintain the table of currently available channel capacities in at least one of a plurality of manners. The third system can periodically interrogate the first $S_1$ and second $S_2$ CTI systems to determine the currently available channel capacities and amend the table in light of the results of the interrogation. Alternatively, the first $S_1$ and second $S_2$ CTI systems may send to the third system $S_3$ indications of the available channel capacities as and when the capacities vary.

Although the preceding discussion has considered line availability, the third system could also be used to control line type, line bandwidth, and so on. For example, the initial message sent to the third communication system might contain an indication of the type of the required communication channel. In this approach the third system $S_3$ typically maps channel type against the typical capacities required to support such a channel and amends a table of available channel capacities accordingly. Thus if the first CTI system $S_1$ requires a channel of telephony type, the third system $S_3$, in response to the request or the indication that the channel has been established, may deduct 3.4 kHz from the incoming and outgoing channel capacities of the first and second CTI systems respectively.

Although the system of FIG. 6 may be used for selecting route direction on the basis of line availability as described above, this has the disadvantage that the third system $S_3$ needs to be kept constantly informed of the current status of the first and second CTI systems. This can result in a significant overhead.

The embodiment of FIG. 6 is more appropriate where the data stored by the third communication system relates to the call tariffs prevailing at the first $S_1$ and second $S_2$ CTI systems, and where the determination made by the third system $S_3$ is based upon those prevailing call tariffs. This arrangement has the advantage that the tariffs are only changed infrequently. Moreover, the tariff information need only be stored at one site. Note that typically $S_3$ will serve as a control centre not just for the first and second CTI systems, but also for many other CTI systems (not shown) attached to the telephone network and the Internet.

Whilst FIG. 6 depicts the third system $S_3$ as being remote from both the first and second CTI systems, this need not be the case. Rather, $S_1$ or $S_2$ could logically function as $S_3$. Another possibility is that $S_3$ may be a distributed system, spread across one or more sites. There may also be more than one copy of $S_3$, to provide redundancy or to improve response times. The system $S_3$ may belong to the same organisation as the first and second organisations, or it may belong to a third party which might be offering a call cost minimisation service to the owner (or owners) of CTI systems $S_1$ and $S_2$.

Figure 7:
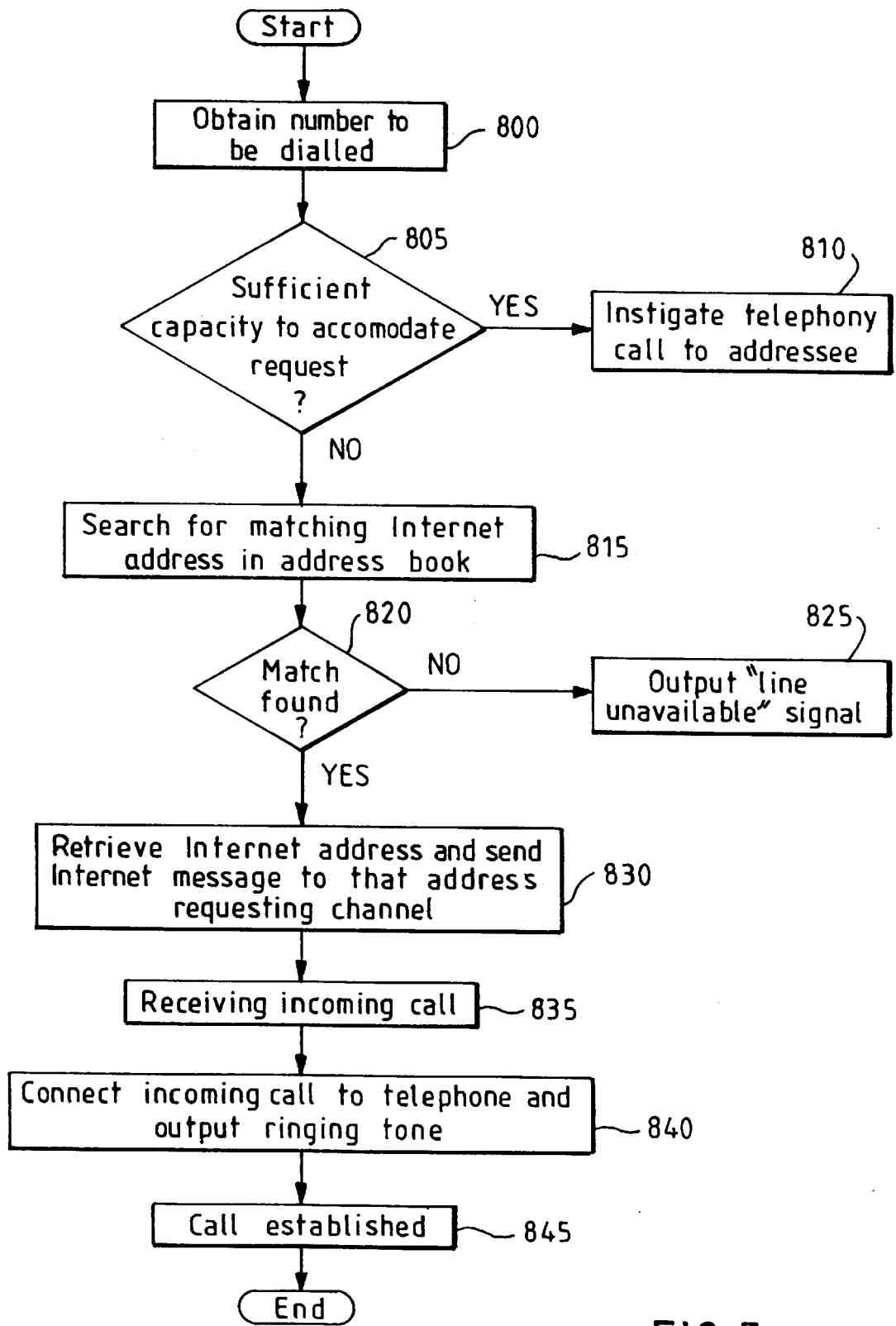
FIGS. 7 and 8 are flow charts illustrating the method of establishing a communication channel between two CTI systems such as shown in FIG. 2.

Referring now to FIG. 7, there is shown a flow chart of a method of establishing a communication channel between two CTI systems for the arrangement schematically depicted in FIG. 2, from the perspective of the CTI system which originates the call. At step 800 the first CTI system $S_1$ obtains a number to be dialled from a user of a telephone connected to said CTI system. Alternatively, the user may select a number to be dialled from a plurality of numbers contained within a data base of telephone numbers or an address book, such as that shown in FIG. 4, stored within or accessible from the first CTI system $S_1$. The first CTI system $S_1$ determines at step 805, for example, whether or not it has sufficient outgoing channel capacity to accommodate the user's request for a telephony channel to the given number. If the first CTI system $S_1$ does have sufficient outgoing channel capacity, establishment of the telephony connection to the second CTI system $S_2$ is instigated by the first CTI system $S_1$ in the conventional manner at step 810. However, if the determination at step 805 is such that the first CTI system $S_1$ does not have sufficient outgoing capacity to accommodate the user's request, a search of the address book for a matching telephone number is made at step 815. A determination is made at step 820 as to whether or not a matching number was located. If a matching telephone number cannot be located, a "line unavailable" tone is output to the user at step 825 as the first CTI system $S_1$ is unable to send a message to the second CTI system $S_2$ soliciting the establishment of a communication channel. This would typically be the case where the call is to an external party, who is unable (perhaps because they do not have a CTI system) or unwilling to pay for the call.

In the event that a matching telephone number can be located, the Internet address associated with that number is retrieved and an Internet message is sent, at step 830, to the second CTI system containing an indication that a call should be established from that second CTI system $S_2$ to the first CTI system $S_1$. The second CTI system then initiates the call, which is received at the first CTI system $S_1$, step 835. In response to this, the incoming call is connected to the telephone of the user who first requested the call at step 840, and a ringing tone is provided. Finally, the call is established at step 845 when both parties have answered their telephones.

Figure 8:
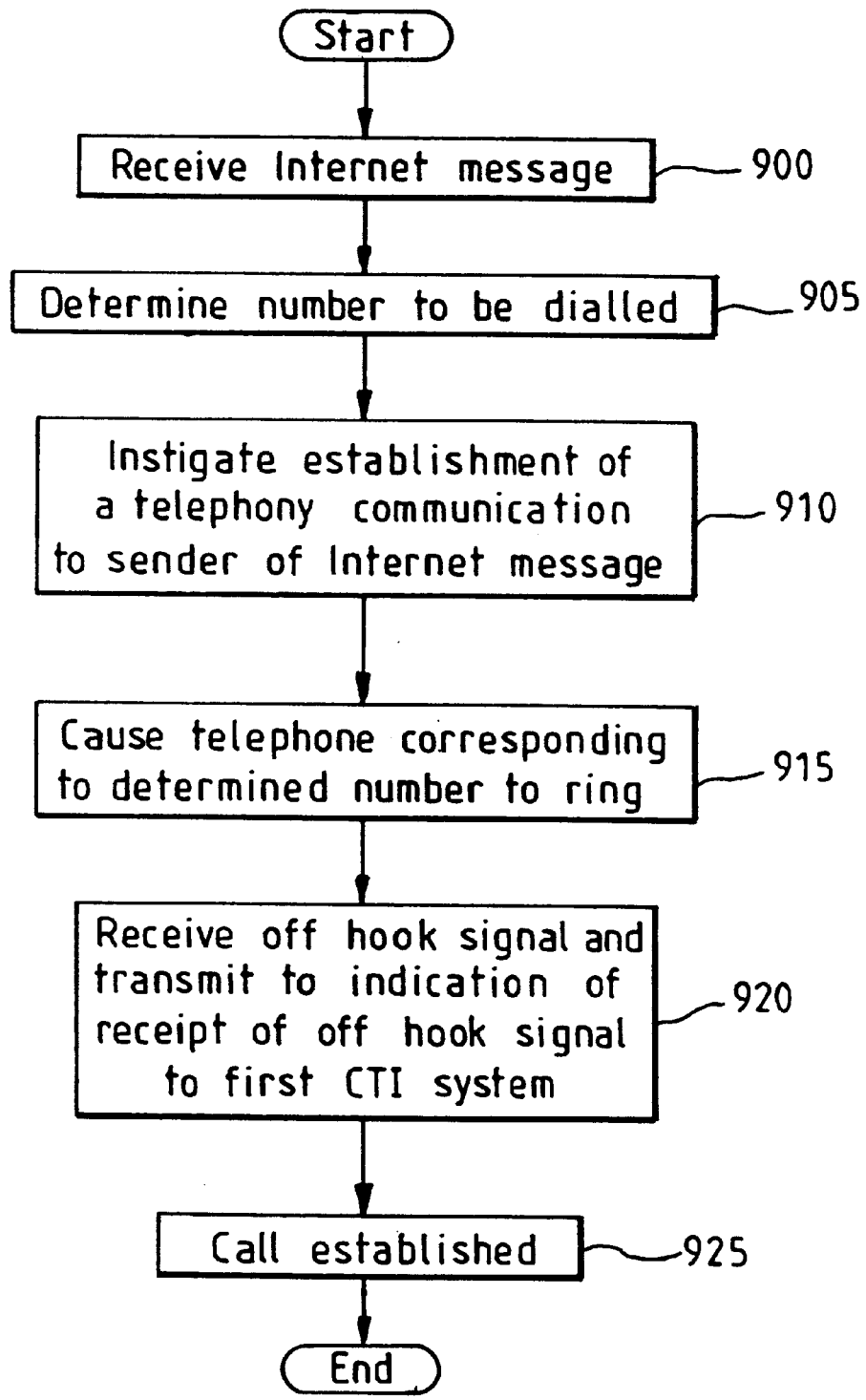

Referring now to FIG. 8, there is shown a flow chart of a method of establishing a communication channel between two CTI systems for the arrangement schematically depicted in FIG. 2, from the perspective of the CTI system which originally is to receive the call (ie this is the counterpart to the method shown in FIG. 7). The second CTI system $S_2$ receives the Internet message at step 900 and determines the number to be dialled at step 905. The second CTI system $S_2$ then dials the number associated with the first CTI system $S_1$ thereby instigating establishment of a communication channel to the first CTI system $S_1$ at step 910. The telephone corresponding to the number contained in the Internet message is caused to ring at step 915. Assuming the user to be present, the off-hook signal is received at step 920 and an indication to that effect is transmitted to the first CTI system $S_1$ via the telephony connection established between the first $S_1$ and second $S_2$ CTI systems. This leads to the establishment of the desired call at step 925.

Although the messages in the above embodiments have been transmitted or exchanged via the Internet, the present invention is not limited thereto. The messages can be exchanged using any communication channel which has sufficient capacity to support the transmission of such messages (clearly the protocol and addressing used for the messaging would have to be appropriate to whichever network was used, as is known in the art). For example one possibility would be to use a corporate intranet, which is a network having the same protocols etc as the Internet, but which, typically for security reasons, is not actually connected into the Internet. An intranet is particularly suited to the use of the invention for corporate telephone communications, where the call can be instigated by (and presumably charged to) whichever party will result in the lowest overall cost for the corporation.

The invention can also be extended to the situation where the outgoing channel capacity is insufficient to support a communication channel of the type requested by a user, but sufficient to support the transmission of a simple message indicating that the intended recipient should instigate the establishment of a communication having the requisite capacity (assuming of course that the initiator has sufficient incoming capacity). For example, a first system may wish to exchange video data with a second system. However, if there is not sufficient outgoing channel capacity from said first system to establish a video communication but there does exist incoming channel capacity to support the establishment of a video channel, then assume nevertheless that there is sufficient outgoing capacity to support an exchange of data between said first and second CAT systems: in such circumstances, the first system would transmit a message to said second system using the available outgoing channel capacity. This message would request the second system to establish a communication channel for video communications back to the first system. The systems in this example may be CTI systems, or they may be any other form of communication system having limited traffic capacity or subject to channel or cost constraints.

Figure 9:
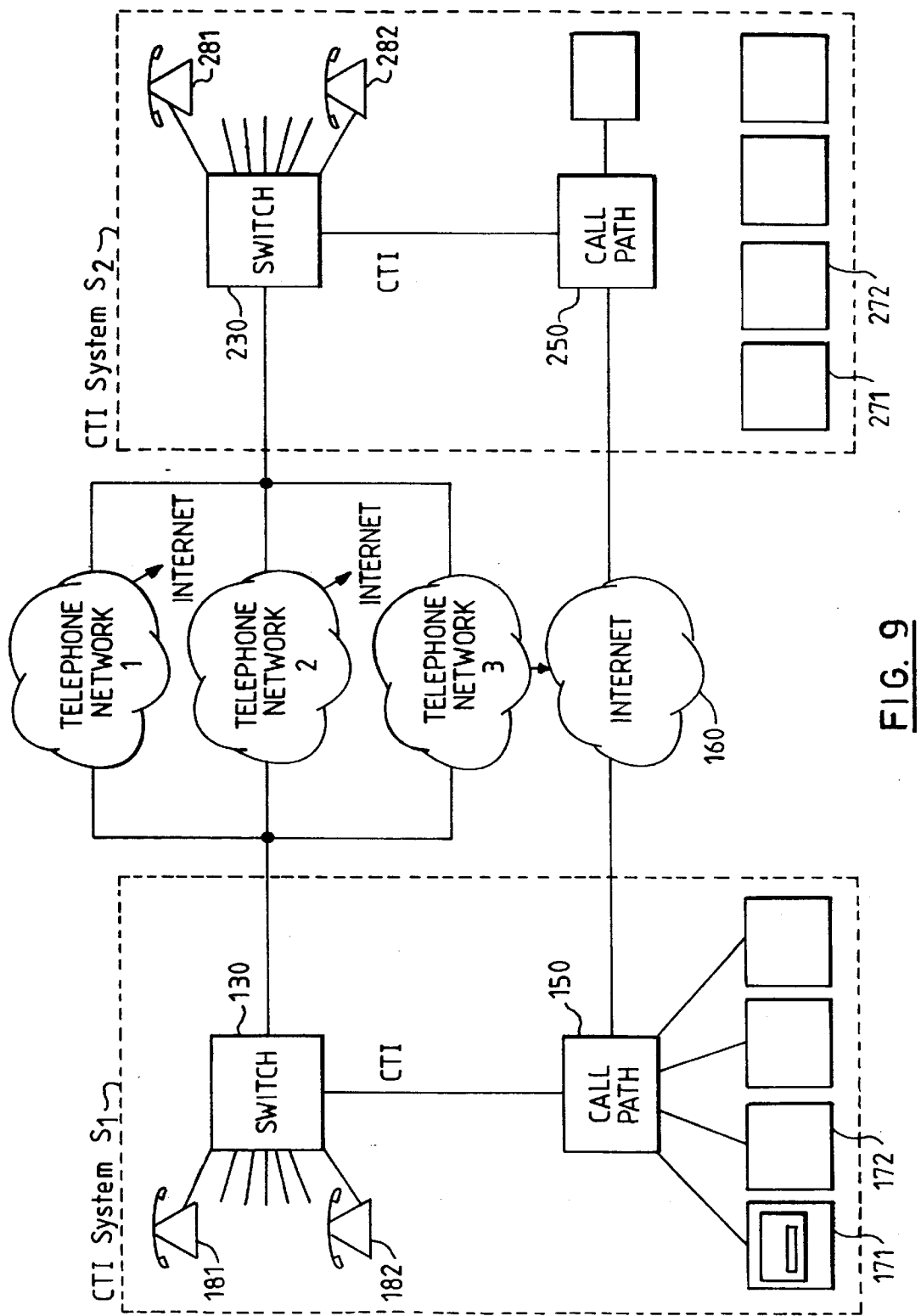
FIG. 9 illustrates schematically two CTI systems connected by three telephone networks and by the internet.

A further embodiment (FIG. 9) where there is more than one telephone network provider and the CTI system is able to choose between them may be used in combination with the earlier described embodiments or separate from them. The embodiment has two CTI systems with telephone networks 1, 2 and 3. Telephone network 1 maybe a local provider offering an international service and Telephone networks 2 and 3 maybe alternative local or international providers, they may also be agencies who have bought up telephone capacity in bulk from an existing supplier for selling at a discount. Typically the user initially specifies a telephone number of the intended addressee, either using telephone extension 181 or terminal 171, and this is passed to the server 150, directly or via switch 130 as appropriate. The first CTI system then uses a look-up table (similar to FIG. 4) to obtain the internet address of one or more telephone network providers which may connect the user to the addressee.

Figure 10:
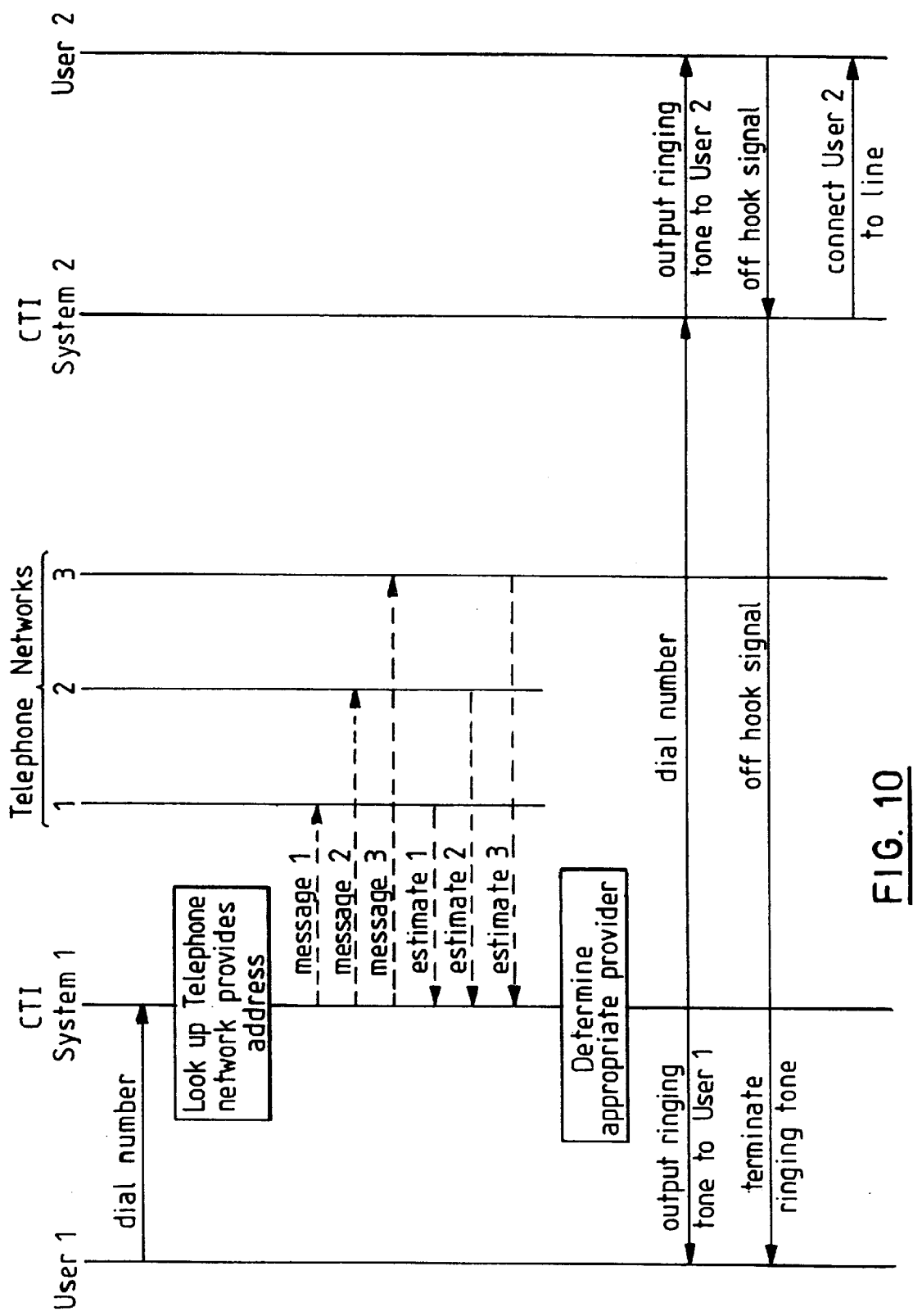
FIG. 10 is the signal exchange of the arrangement of FIG. 9 in setting up a telephone connection.

The embodiment may be understood further from the signalling underlying the above implementation (FIG. 10). Once the user has specified a telephone number and the Internet addresses of the telephone network providers is obtained, an Internet message is then sent to each provider (Message 1, 2 and 3). A message comprises some information on the user such as his telephone number or location and the telephone number or location of the addressee. From this information, each telephone provider may send an estimate message (Estimate 1, 2 and 3) comprising a cost estimate or other indicator of the cost of the call. If no response is made from the network providers or a response has taken too much time to reach the user then a default provider is chosen to set up the connection.

However, if connection information is received then, CTI system 1 determines which of the telephone network providers is appropriate or in the present case which one of the providers is the best value for the money. Other factors may be taken into account when determining which provider to use such as, for instance, the bandwidth and reliability of the provider's lines or the type of connection when both satellite and ground line providers are available. CTI system 1 then instigates the telephony call through that provider to CTI system 2. Alternatively CTI system 1 determines which of CTI system 1 or 2 is to instigate the call as described previously (FIG. 5) by sending an internet message to CTI system 2.

Figure 11A:
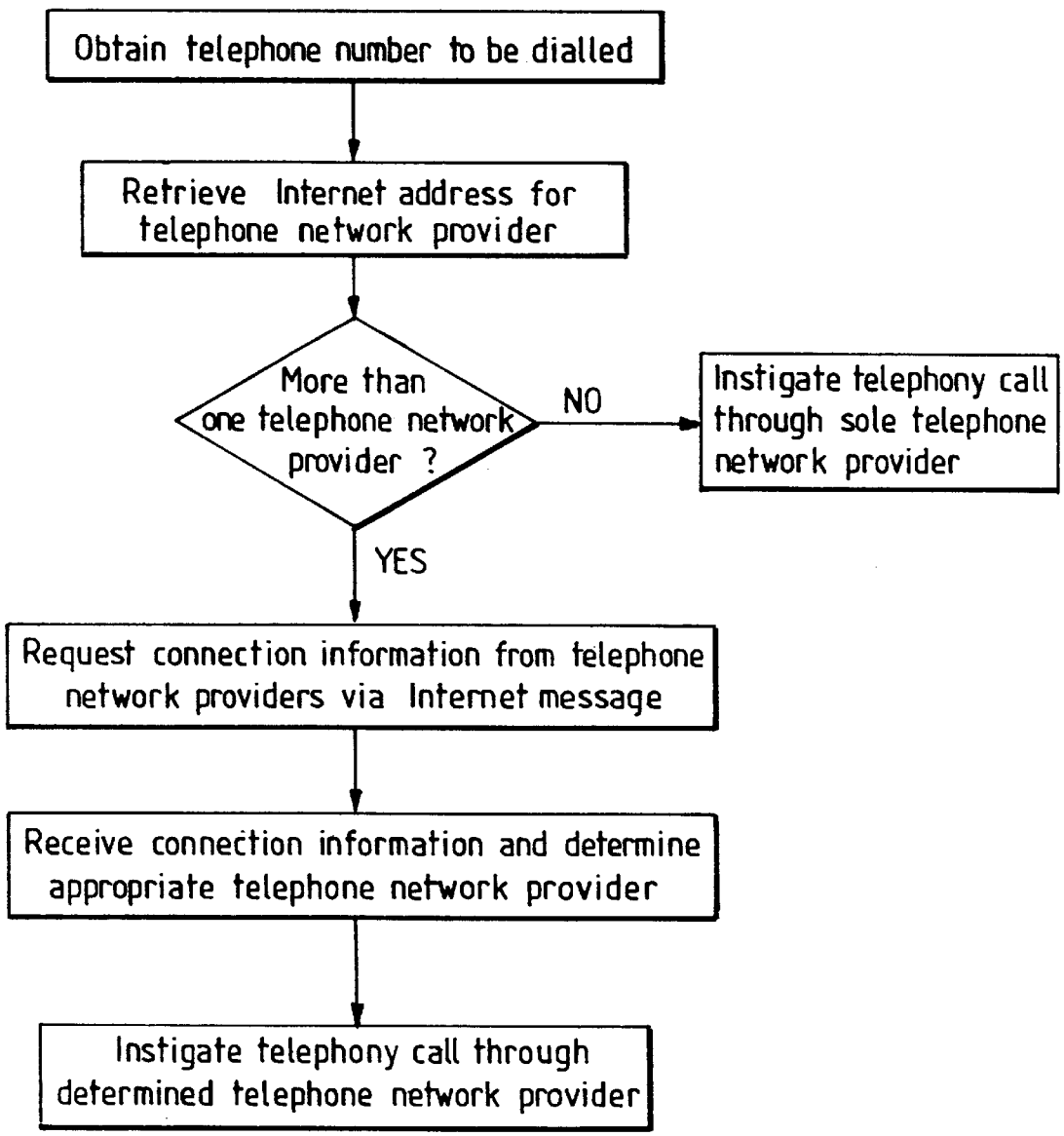
FIGS. 11A and 11B are flow charts illustrating the method of establishing a communication channel between two CTI systems such as shown in FIG. 9.

The method used by a CTI system to make a call (FIG. 11A) is initiated by first obtaining the telephone number of the addressee. Then the internet addresses of the available telephone network providers is obtained from a table stored in the system's memory; if there is only one network provider then the CTI system will use that one to set up the call. However, when more than one telephone network provider is available a choice has to be made. Each of the telephone network providers is contacted over the internet using their internet addresses and a request for connection information made. Once connection information has been gathered in from the telephone network providers the CTI system determines which one of the providers is appropriate for this particular call. Normally this will involve comparing each of the prices but it could involve comparing other factors as mentioned above. Once the telephone network provider is determined then the CTI system may instigate the call or then go on to determine which of the CTI systems should instigate the call.

Figure 11B:
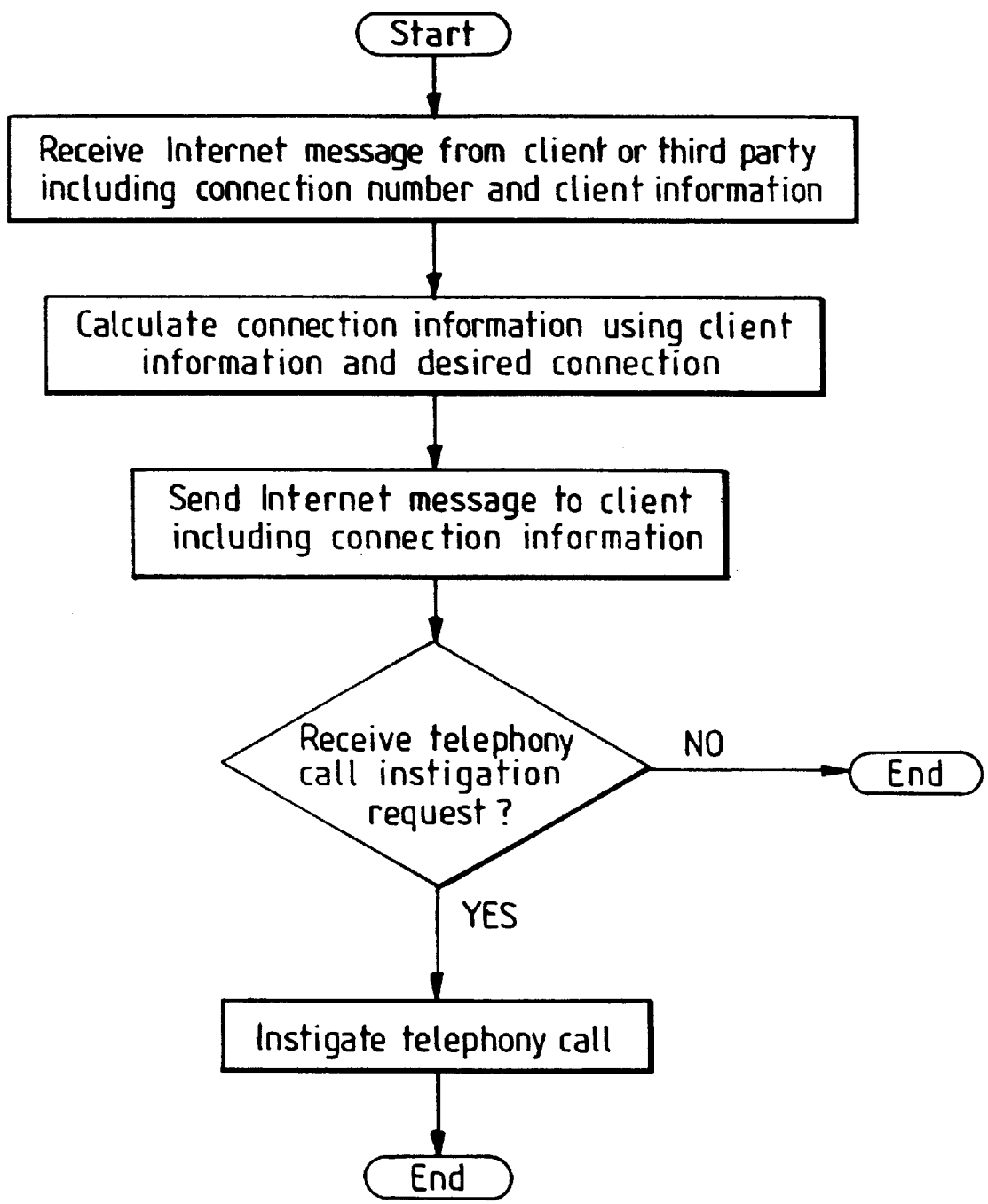

A network provider must perform certain steps (FIG. 11B) to perform the embodiment described above. An internet message is received from a client including a connection number and the network provider calculates estimate information such as the call rate and sends a new internet message to the client including the estimate information. If the client determines that the network provider is the most appropriate one to use then a call request will be sent to the provider through normal telephony channels by the client or by the addressee. One way of doing this is to prefix the dialled number with an access code corresponding to the network provider as can be carried out at present by an IBM Callpath Server. Alternatively it may also be possible to send a request to the provider through the internet so that the provider sets up the connection at both ends.

As an alternative to the above, the determination of the telephone network provider may be carried out at a third party or a fourth communication system (not shown) connected to the other communication systems by the internet. Instead of the addresses of each provider being kept at the outgoing CTI system they may be located at only the one communication system thus saving memory and processing resources. The first and last steps of obtaining the telephone number and instigating the call through the determined telephone provider are taken at the originating communication system, where the fourth communicating system determines the provider. As an alternative, the fourth communicating system can send a further internet message to the determined telephone provider containing a set up of the connection requests.

A further alternative includes a database at the fourth communicating system including data representative of the call tariffs at each of the plurality of telephone networks. In this alternative it is not necessary for the fourth communicating system to send messages to each of the telephone network providers every time it needs call tariff information. Instead the information is readily at hand for an even faster determination of the most appropriate provider to use and the information may be updated periodically with a frequency dependent on the fluidity of the market.

We claim:

1. A method of establishing a communication channel between first and second communication systems connected by a computer network and at least one telephony network, the method comprising the steps of:

requesting over said computer network the establishment of a communication channel between the first and second systems, said communication channel comprising a connection over one of said telephony networks;

establishing whether or not sufficient outgoing channel capacity is available from the first system to the second system to support the communication channel;

transmitting over said computer network, in response to establishing that there is insufficient available outgoing channel capacity from the first system to support the communication channel, a message to the second system requesting the second system to instigate establishment of the communication channel; and establishing the communication channel according to a result of said establishing channel capacity step.

2. A method of establishing a communication channel between first and second communication systems connected by a computer network and at least one telephony network, the method comprising the steps of:

requesting over said computer network the establishment of a communication channel between the first and second systems, said communication channel comprising a connection over one of said telephony networks;

ascertaining whether or not it is more cost efficient to instigate establishment of the communication channel at the first or the second communication system;

instigating, in response to ascertaining that it is more cost effective to instigate establishment of the communication channel at the first communication system, said communication channel from said first communication system; and transmitting over said computer network, in response to ascertaining that it is more cost effective to instigate establishment of the communication channel at the second communication system, a message to the second system requesting the second system to perform said instigating of establishment of the communication channel.

3. The method as claimed in claim 2, wherein said step of ascertaining is performed at a third communication system connected to said first and second communication systems by said computer network.

4. The method as claimed in claim 3, further comprising the step of maintaining at the third system data relating to the first and second communication systems for use in the step of ascertaining, said data including data representative of one or more prevailing call tariffs at said first and second communication systems.

5. The method as claimed in claim 4, wherein the step of maintaining the data further comprises the step of receiving updates from said first and second communication systems concerning their respective ones of said prevailing call tariffs.

6. The method as claimed in claim 3, wherein said computer network is a public network known as "the Internet".

7. The method as claimed in claim 2, wherein said step of ascertaining is performed at said first communication system.

8. A method of establishing a communication channel between first and second communication systems connected by a computer network and at least one telephony network, the method comprising the steps of:

requesting over said computer network the establishment of a communication channel between the first and second systems, said communication channel comprising a connection over one of said telephony networks;

transmitting a message from the first communication system, which originally desires the communication channel to be established, to said second communication system;

waiting a predetermined period of time for a response to the transmission;

deciding in the absence of said response within said predetermined time that said first communication system should establish the communication channel; and establishing at said second communication system said communication channel.

9. A method of establishing a communication channel between first and second communication systems connected by a computer network and at least one telephony network, the method comprising the steps of:

requesting over said computer network the establishment of a communication channel between the first and second systems, said communication channel comprising a connection over one of said telephony networks;

ascertaining that there is insufficient available outgoing channel capacity from the first communication system to support the communication channel but sufficient available outgoing channel capacity from the first communication system to transmit a request for the communication channel to be established;

transmitting said request from the first communication system using said available outgoing channel capacity, said request containing an indication that the second system should instigate establishment of said communication channel; and instigating establishment of said communication channel at said second system.

10. A method of establishing a communication channel between first and second communication systems connected by a computer network and at least two telephony networks, the method comprising the steps of;

requesting over said computer network the establishment of a communication channel between the first and second systems;

sending a first data message over said computer network to each of said at least two telephony networks, wherein said first message requests connection information regarding said telephony network;

receiving a response to said first data message from one or more of said telephony networks, wherein each of said responses contains a version of said requested connection information;

determining which one of the at least two telephony networks is to route the communication channel based upon comparing said received responses; and establishing the communication channel according to a result of said determining step.

11. The method as claimed in claim 10, wherein the step of determining which one of the plurality of telephony networks to use comprises ascertaining which one is more cost effective.

12. The method as claimed in claim 10, wherein said step of determining which one of the plurality of telephony networks to use is performed at a third communication system, said third communication system being connected to said first and second communication systems by said computer network, by sending a second data message over said computer network to the third communication system, wherein said second data message requests said third communication system to perform said determining step, and wherein said steps of sending said first data message, receiving said responses, and determining occur at said third system in response to said second data message.

13. The method as claimed in claim 10, wherein the one of said first and second communication systems performing said requesting step is a computer integrated telephony system.

14. Apparatus for establishing a communication channel between first and second communication systems connected by a computer network and at least one telephony network, comprising:

means for receiving a request over said computer network for the establishment of a communication channel between the first and second systems, said communication channel comprising a connection over one of said telephony networks;

means for determining whether the first or second communication system should establish the communication channel;

means for instigating, in response to determining that the first communication system should establish the communication channel, establishment of the communication channel from said first communication system; and transmitting over said computer network, in response to determining that the second communication system should establish the communication channel, a message to the second communication system requesting the second communication system to instigate establishment of the communication channel.

15. A method of establishing a communication channel between first and second communication systems connected by a computer network and at least one telephony network, the method comprising the steps of:

requesting over said computer network the establishment of a communication channel between the first and second systems, said communication channel comprising a connection over one of said telephony networks;

sending a message from said first communication system to a third communication system, said message requesting said second communication system to ascertain whether or not it is more cost effective to instigate establishment of the communication channel at the first or the second communication system;

instigating, in response to ascertaining that it is more cost effective to instigate establishment of the communication channel at the second communication system, said communication channel from said second communication system; and transmitting over said computer network, in response to ascertaining that it is more cost effective to instigate establishment of the communication channel at the first communication system, a response to the first system requesting the first system to perform said instigating of establishment of the communication channel.

16. A method of establishing a communication channel between first and second communication systems connected by a computer network and a plurality of telephony networks, the method comprising the steps of:

requesting over said computer network establishment of a communication channel between the first and second systems, said communication channel comprising a connection over one of said telephony networks;

sending a data message to a third communication system, said third communication system being connected to said first and second communication systems by said computer network and having stored data related to call tariffs for each of said plurality of telephony networks;

receiving said data message at said third communication system;

determining using said stored call tariff data, in response to said receiving, which one of the plurality of telephony networks is to route the communication channel; and establishing the communication channel according to a result of said determining step.

17. A method of establishing a communication channel between first and second communication systems connected by a computer network and a plurality of telephony networks, the method comprising the steps of:

upon detecting at said first communication system that there is insufficient outgoing channel capacity to establish said communication channel between said first and second communication systems, sending a data message to a third communication system, said third communication system being connected to said first and second communication systems by said computer network and having stored data, wherein said stored data includes information regarding currently available incoming and outgoing channel capacities of said first and second communication systems;

receiving said data message at said third communication system;

determining, in response to said receiving, whether said second communication system has sufficient outgoing channel capacity to support said communication channel, using said stored data;

sending, from said third communication system, a request message to said second communication system when it is established that said second communication system has sufficient outgoing capacity, wherein said request message requests said second communication system to instigate establishment of said communication channel.

* * * * *